Aug. 27, 1946.  C. W. DYER  2,406,595
SPROCKET DRIVE FOR MOTION PICTURE PROJECTORS
Filed March 14, 1945
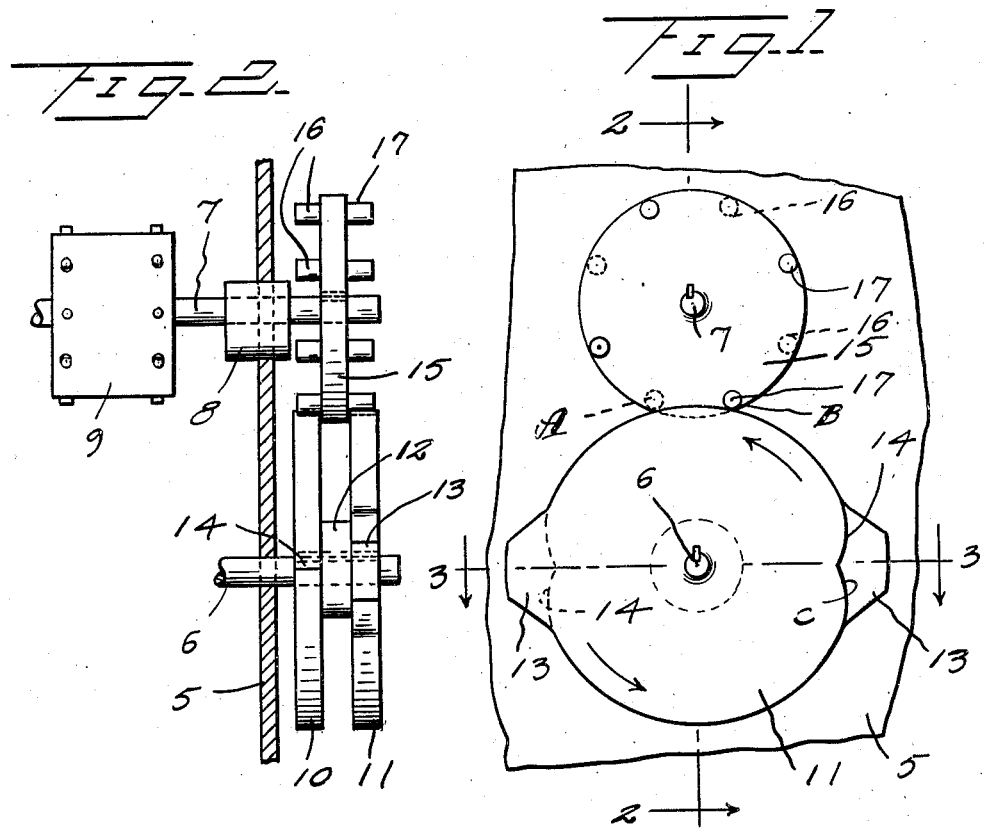
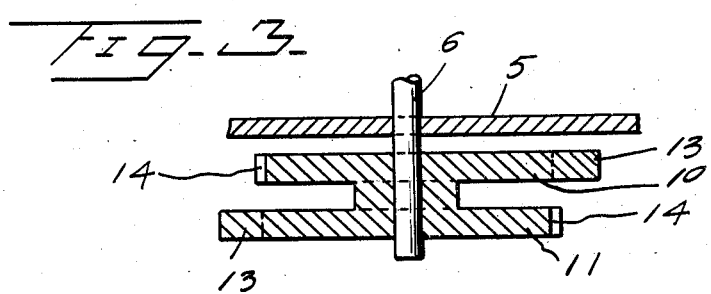
Inventor
C. W. Dyer
By Randolph & Beavers
Attorneys Patented Aug. 27, 1946

2,406,595

UNITED STATES PATENT OFFICE 2,406,595

SPROCKET DRIVE FOR MOTION-PICTURE PROJECTORS

Charles W. Dyer, Stratton, Maine

Application March 14, 1945, Serial No. 582,695

3 Claims. (Cl. 88—18.3)

1

The present invention relates to motion picture projectors and more particularly to a sprocket drive mechanism for feeding the film through the projector.

An object of the invention is to provide a sprocket drive mechanism of this character adapted particularly for use with motion picture projectors of either 8 or 16 mm. film and adapted to maintain a loop in the film of desired size to prevent cracking or breaking of the film during the feeding thereof through the projector.

A further object of the invention is to provide a sprocket drive mechanism of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a side elevational view of the drive mechanism.

Figure 2 is a sectional view taken substantially on a line 2—2 of Figure 1, and

Figure 3 is a transverse sectional view of the driving cams taken substantially on a line 3—3 of Figure 1.

Referring now to the drawing in detail, wherein for the purpose of illustration I have disclosed a preferred embodiment of the invention, the numeral 5 designates a portion of the housing of the motion picture projector in which a drive shaft 6 and driven shaft 7 are journaled.

The driven shaft 7 is journaled in an eccentric bushing 8 by means of which the shaft 7 may be adjusted to take up wear in the drive mechanism.

A film sprocket 9 is secured to the shaft 7 for feeding the film through the projector at a desired uniform speed and to maintain a loop in the film of a desired size to prevent cracking or breaking of the film.

Secured to the drive shaft 6 is a pair of cam disks 10 and 11 maintained in spaced-apart relation by a spacing washer 12.

Each of the disks is formed on the peripheral edge thereof with a tapering cam hump 13 and at a diametrically opposite edge with a shallow groove or valley 14.

The disks 10 and 11 are secured on the shaft 6 in a position so that the hump 13 of one of the

2 disks will be adjacent the groove or valley 14 of the other of the disks, as will be apparent from an inspection of Figures 1 and 3 of the drawing.

A driven disk 15 is secured to the shaft 7 with its edge projecting between the disks 10 and 11. Pegs 16 and 17 project from opposite sides of the disk 15 adapted to ride on the peripheral edges of the disks 10 and 11. The pegs 16 and 17 are staggered with respect to each other to space the same from each other circumferentially of the disk 15 and the pegs are spaced from each other at the opposite sides of the disk 15 a proper distance so that when one of the cam humps 13 engages the peg A, as indicated in Figure 1 of the drawing, the disk 15 will be moved in a direction as shown by the arrows so that the peg B at the opposite of the disk 15 will then be moved into a position for seating in the groove or valley 14 of the other drive disk and as the rotation of the drive disks continues, the trailing edge C of the groove or valley will also act to continue the rotation of the disk 15. Thus both the cam humps 13 and the cam grooves or valleys 14 function to engage the pegs 16 and 17 for driving the disk 15 and the sprocket 9.

The feed sprocket 9 is thus driven with long pauses in a substantially step-by-step movement.

In view of the foregoing description, taken in conjunction with the accompanying drawing, it is believed that a clear understanding of the construction, operation and advantages of a drive mechanism of this character will be quite apparent to those skilled in the art. A more detailed description thereof is accordingly deemed unnecessary.

It is to be understood, however, that even though I have herein shown and described a preferred embodiment of my invention, that the same is susceptible to certain changes fully comprehended by the spirit of the invention as herein described, and the scope of the appended claims.

Having thus described the invention, what I claim is:

1. A sprocket drive for motion picture projectors and comprising a pair of spaced-apart driving cams, each of said cams having a radially projecting hump and a substantially shallow valley at diametrically opposite edges of the cam, a drive shaft connected to the cams and with the hump of each cam arranged adjacent the valley of the other cam, a driven disk, a feed sprocket attached thereto, and pegs projecting from opposite faces of the disk for alternate engagement by the humps and valleys to rotate the disk in a step-by-step movement.

2. A sprocket drive for motion picture projectors and comprising a pair of spaced-apart driving cams, each of said cams having a radially projecting hump and a substantially shallow valley at diametrically opposite edges of the cam, a drive shaft connected to the cams and with the hump of each cam arranged adjacent the valley of the other cam, a driven disk, a feed sprocket attached thereto, and pegs projecting from opposite faces of the disk and disposed in the path of the humps and adapted to enter said valleys for driving engagement by the trailing edges of the valleys for successively rotating the disk in a step-by-step movement.

3. A sprocket drive for motion picture projectors and comprising a pair of spaced-apart driving cams, each of said cams having a radially projecting hump and a substantially shallow valley at diametrically opposite edges of the cam, a drive shaft connected to the cams and with the hump of each cam arranged adjacent the valley of the other cam, a driven disk having its edge positioned between the cams, a feed sprocket attached to the disk, and pegs projecting from opposite faces of the disk and disposed in the path of the humps and adapted to enter said valleys for successively rotating the disk in a step-by-step movement.

CHARLES W. DYER.